April 6, 1948.    O. H. SCHADE    2,439,223
RECTIFIER SYSTEM
Filed Feb. 19, 1945    3 Sheets-Sheet 1
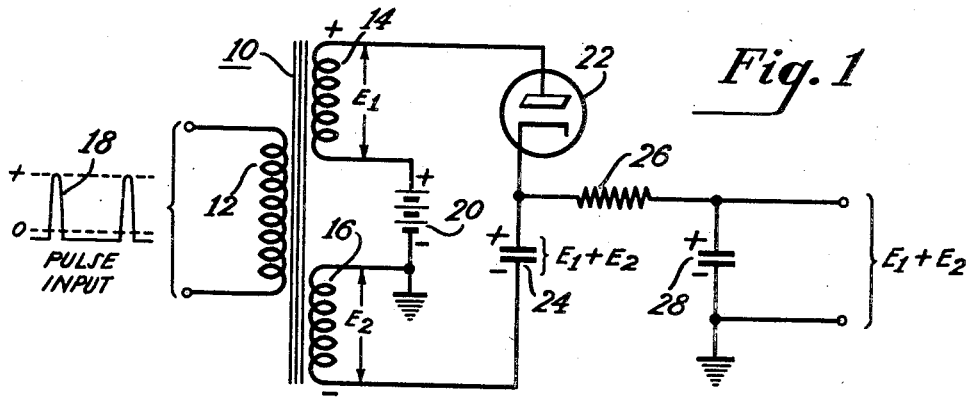
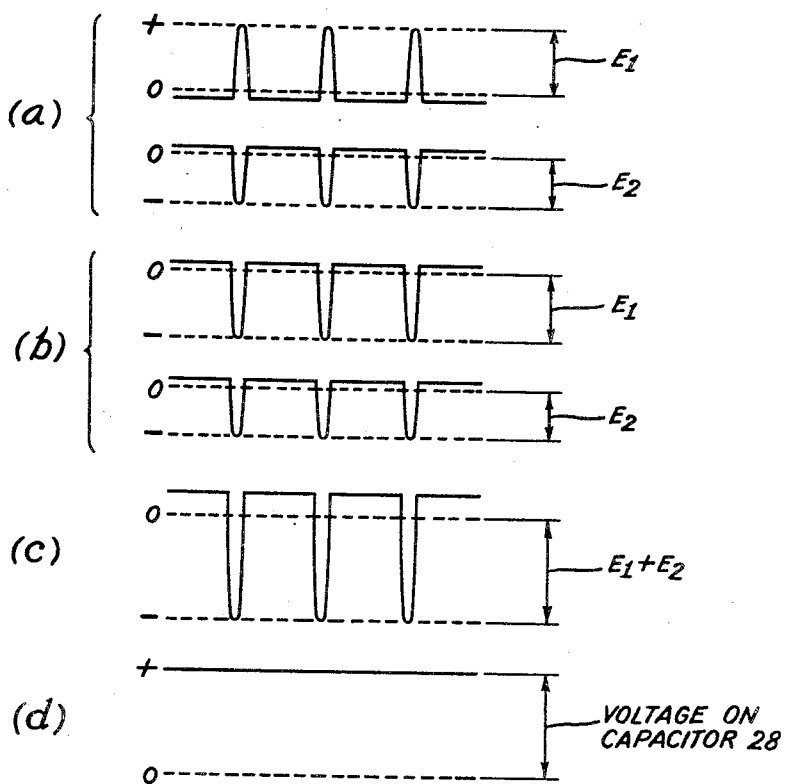
INVENTOR.
Otto H. Schade
BY
H. S. Grover.
ATTORNEY.

INVENTOR.
Otto H. Schade
BY
H. S. Grover.
ATTORNEY.

INVENTOR.
Otto H. Schade
BY H. S. Grover.
ATTORNEY.

Patented Apr. 6, 1948

2,439,223

UNITED STATES PATENT OFFICE 2,439,223

RECTIFIER SYSTEM

Otto H. Schade, West Caldwell, N. J., assignor to Radio Corporation of America, a corporation of Delaware Application February 19, 1945, Serial No. 578,678

19 Claims. (Cl. 171—97)

The present invention relates to surge voltage rectifier circuits, and more particularly to single or cascaded rectifiers which operate from a unidirectional pulse input.

It is well known in the art to employ circuits for increasing the peak voltage obtainable from a wave which periodically reverses in polarity. This is customarily accomplished by utilizing one or more pairs of electron discharge tubes, one tube in each pair conducting on positive alternations of the input wave and the other tube conducting on negative alternations. Rectifier tubes so utilized are usually connected to a condenser or some other form of energy-storage device, the latter comprising the source of output voltage for the system.

However, a voltage step-up or doubling arrangement such as above set forth is not operative when the energy input thereto consists substantially of pulses of a single polarity. Under this condition, one rectifier tube in each pair is at no time conductive and consequently supplies no output energy. Furthermore, the design of conventional voltage doubling circuits adapts them for use primarily in connection with a low voltage sinusoidal input. They are in many cases unsuited for use where output potentials which may rise as high as several thousand volts are required, such, for example, as those applied to the electrodes of the cathode ray tube used in television transmitters and receivers.

An alternative to the use of rectifying arrangements for obtaining high potentials in transformer-coupled television scanning circuits resides in the utilization of a step-up winding to increase the peak surge voltage developed across either the primary or secondary of the transformer. However, a transformer step-up winding of this nature causes increased capacitive loading, and reduction of the reflected plate inductance is necessary to meet retrace time requirements with a consequent loss of scanning current in the transformer secondary circuit.

The present invention overcomes the above disadvantages by providing means for obtaining a smooth D.-C. potential from a series of relatively short voltage pulses of a single polarity, such, for example, as those appearing during retrace periods across the primary winding of a coupling transformer in a television scanning circuit. Furthermore, when the secondary winding of this coupling transformer is so designed that both positive and negative surge voltages appear simultaneously across different portions thereof, the present invention discloses an arrangement whereby a D.-C. voltage output may be derived which will have an amplitude equal to the sum of the individual amplitudes of these positive and negative surge voltages.

According to a further feature of the present invention, two or more high-voltage rectifying units are connected in cascade so as to yield an output potential which is approximately the sum of the potentials developed by the individual units. Moreover, this increase in output is obtained without subjecting any of the circuit components to more than a few volts in excess of the normal D.-C. output voltage per unit, thus effecting considerable economies in the design and construction of these components.

One object of the present invention, therefore, is to provide a simple and efficient rectifying circuit operating from a unidirectional pulse input.

Another object of the invention is to provide a circuit for obtaining a smooth D.-C. output voltage from an input consisting of a series of relatively short pulses of a single polarity.

A further object of the invention is to provide, in a system in which both positive and negative surge voltages are developed across circuit inductances by the application thereto of a series of unidirectional pulses, an output voltage which is substantially the sum of both these positive and negative surge voltages.

A still further object of the invention is to provide a voltage step-up circuit comprising a plurality of rectifying units arranged in cascade, whereby the voltage output of the step-up circuit will be substantially the sum of the voltages developed by the individual rectifying units.

An additional object of the invention is to provide a multiple-unit rectifying system of the cascade type in which the peak voltage developed on the various components during operation of the system is only slightly in excess of the normal D.-C. output voltage per unit.

Other objects and advantages will be apparent from the following description of preferred forms of the invention and from the drawings, in which:

Fig. 1 is a circuit diagram of a preferred form of single-unit rectifying system in accordance with the present invention;

Fig. 2 is a set of wave forms illustrating the operation of the system of Fig. 1;

Figure 3:
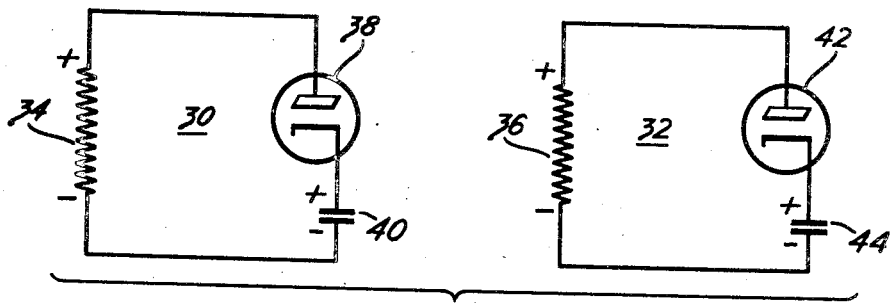
Figs. 3, 4 and 5 are circuit diagrams illustrating the principle of operation of a preferred form of multiple-unit rectifying system in accordance with the present invention.

Referring now to Fig. 1, there is shown a transformer 10 having a primary winding 12 and two grounded secondary windings 14 and 16. The split secondary of transformer 10 is so wound that the voltages induced on the outer or ungrounded ends of windings 14 and 16 are respectively of positive and negative polarity when a series of unidirectional voltages pulses, such for example as the pulses of positive polarity which are indicated by the reference character 18, are applied across the primary winding 12. The inner end of secondary winding 14 is connected to the positive terminal of a battery 20 or other source of potential of relatively low voltage, while the inner end of secondary winding 16 is connected to the negative terminal of this same potential source. The negative terminal of battery 20 is grounded as shown. In the description of the operation of the circuit of Fig. 1 as given below, the effect thereon of the D.-C. potential provided by battery 20 will be disregarded, and only the effect of the induced voltages on the secondary windings of transformer 10 considered.

A two-element electron discharge tube 22 has its anode connected to the outer end of secondary winding 14 of transformer 10. The cathode of tube 22 is connected to one plate of a capacitor 24, the other plate of capacitor 24 being joined to the outer end of secondary winding 16.

When voltage pulses, such as those indicated at 18, are applied across the primary winding 12 of transformer 10, voltages will be induced across each of secondary windings 14 and 16, these induced voltages being indicated respectively in Fig. 1 as $E_1$ and $E_2$. Since the inner ends of secondary windings 14 and 16 are grounded, the voltages appearing at the outer ends of these windings will be respectively at positive and negative surge potential with respect to ground, and will bear a relation to each other as shown in curve $a$ of Fig. 2.

Since the anode of tube 22 receives directly the positive surge voltage developed across winding 14, and since the cathode of tube 22 receives through capacitor 24 the negative surge voltage developed across winding 16, these voltages are caused to appear across the rectifier circuit consisting of tube 22 in series with capacitor 24 in the same polarity as shown in curve $b$, and consequently add together to produce a voltage having the wave form of curve $c$ with a negative peak amplitude equal to $E_1+E_2$.

While the voltage $E_1+E_2$ charges capacitor 24 so that the upper plate of the capacitor, as viewed in the drawing, is of positive polarity, this voltage is at negative surge potential with respect to ground. By utilizing a resistor 26 connected to the cathode of tube 22, the secondary winding 16 of transformer 10 can be effectively isolated, thereby producing across an output capacitor 28 a smooth D.-C. voltage having a value equal to $E_1+E_2$ and which is at positive potential with respect to ground as shown in curve $d$.

Figure 4:
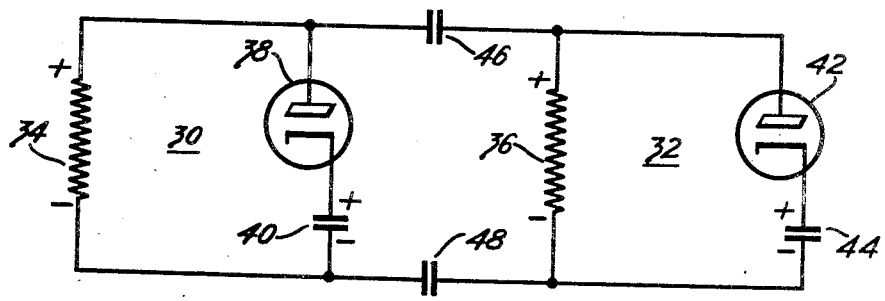
Figure 5:
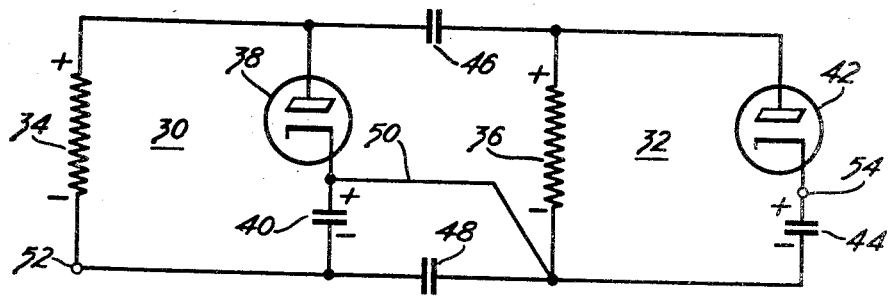

Figs. 3, 4 and 5 illustrate the principle of operation of one type of cascaded rectifier circuit operating in accordance with the present invention. Referring first to Fig. 3, two similar rectifying units 30 and 32 are shown, each of these units including an impedance 34 and 36 respectively which are conductive to direct currents and across which there appears a varying A.-C. potential having the instantaneous polarity indicated. Impedance elements 34 and 36 may, for example, comprise resistances or inductances.

Connected across impedance 34 is an electron discharge tube, such as diode 38, in series with a capacitor 40, the anode of diode 38 being connected to the positive potential end of impedance 34. Similarly, a diode 42 in series with a capacitor 44 is connected across the impedance 36. Under the conditions shown, tubes 38 and 42 will be rendered conductive to charge capacitors 40 and 44 respectively substantially to the positive peak voltage value of the A.-C. wave applied across their respective impedances 34 and 36, the polarity of these charges being as indicated in the drawing.

The present invention provides means for utilizing the sum of the voltages developed by each of several rectifying units or, in the example under discussion, the sum of the charges produced on capacitors 40 and 44. To carry out this object, the units 30 and 32 of Fig. 3 are coupled together, as shown in Fig. 4, by means of the capacitors 46 and 48. A connection 50 is then made, as shown in Fig. 5, between the cathode of tube 38 and the lower or negative potential end of impedance 36. It will now be realized that capacitors 40 and 48 are in parallel relation, and consequently the latter may be omitted from the system as shown by Fig. 5.

If now the potential appearing between points 52 and 54 in Fig. 5 is considered, it will be seen that the capacitors 40 and 44 are connected together by means of the lead 50 so that their voltages are additively combined, or in other words the positive plate of capacitor 40 is joined to the negative plate of capacitor 44, while the remaining plates of the capacitors are connected to the points 52 and 54 which form the output terminals of the system. The voltage developed between these points 52 and 54 therefore will be the sum of the voltages appearing on capacitors 40 and 44.

Figure 6:
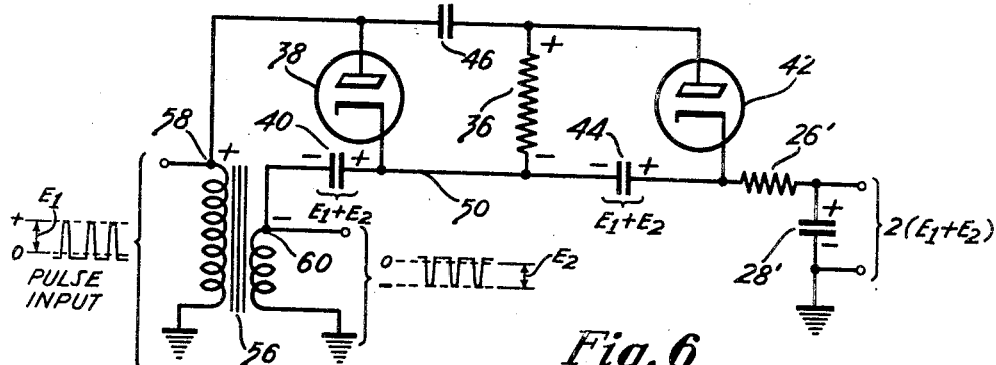
Figs. 6, 7 and 8 are circuit diagrams of preferred forms of commercially practical multiple-unit rectifying systems based on the principle illustrated in Figs. 3, 4 and 5.

Fig. 6 shows a commercially practical multiple-unit rectifier circuit embodying the cascade principle of operation illustrated in Figs. 3, 4 and 5, and also embodying the feature of combining positive and negative surge voltages appearing on a transformer in the manner of the circuit of Fig. 1. In Fig. 6 is illustrated a transformer 56 so wound that when the upper end (in the drawing) of the primary winding is positive, the upper end of the secondary winding is of negative polarity. If the positive peak voltage applied across the primary winding and appearing at point 58 is equal to $E_1$ as shown, and if the negative peak voltage induced in the secondary winding and appearing at point 60 is equal to $E_2$, then the voltage rectified by diode 38 and appearing across capacitor 40 will be equal to $E_1+E_2$ as fully explained in connection with Figs. 1 and 2. It should be noted that the transformer 56 of Fig. 6 replaces the impedance 34 of Fig. 5, with the voltage appearing between points 58 and 60 in Fig. 6 corresponding to that appearing across the impedance 34 in Fig. 5. Elements in Fig. 6 replacing similar circuit components in Fig. 5 have been given the same reference characters.

The A.-C. voltage with the peak voltage sum $E_1+E_2$ developed between points 58 and 60 in Fig. 6 will appear across the coupling impedance 36 because of the capacitive coupling over condensers 40 and 46, and this in turn will cause diode 42 to become conductive to charge capacitor 44 to a peak value $E_1+E_2$, as brought out in the discussion of the operation of Figs. 3, 4 and 5.

The capacitors 40 and 44 being connected in series with proper polarity, the change thereon is applied to an output capacitor 28' having a function similar to capacitor 28 in Fig. 1 through a filter resistor 26' (corresponding to resistor 26 of Fig. 1) so as to yield a smooth output voltage equal to the sum of the charges on capacitors 40 and 44, or 2($E_1+E_2$).

Figure 7:
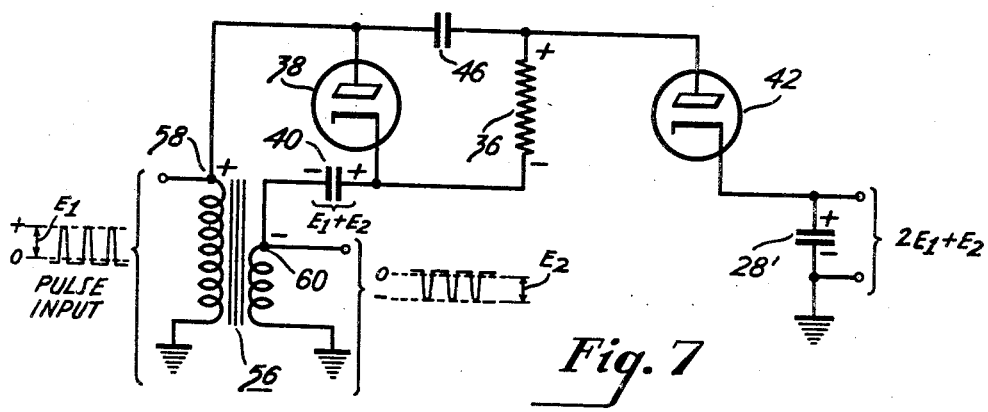

The circuit of Fig. 7 is identical to that of Fig. 6 except for the omission of capacitor 44 and resistor 26'. It will be noted that in the circuit of Fig. 7 the diode 38 rectifies both the positive and negative surge voltages so that the charge on capacitor 40 is equal to $E_1+E_2$ as in Fig. 6. However, the diode 42 rectifies only the positive surge voltage appearing between point 58 and ground, giving a rectified voltage output from diode 42 alone equal to $E_1$. The sum of these rectified voltages appearing across output capacitor 28' is consequently $2E_1+E_2$.

Figure 8:
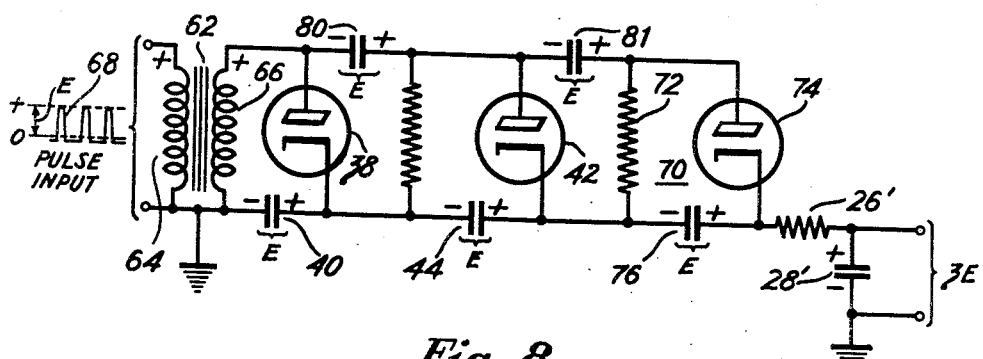

Fig. 8 illustrates a commercially practical circuit utilizing three rectifier units in cascade but in which only a positive surge voltage with respect to ground is rectified. It employs the same principle of operation as the circuit of Fig. 6. Any components in that figure having identical functions in Fig. 8 are given the same reference characters.

In Fig. 8 is shown a transformer 62 having a primary winding 64 and a secondary winding 66. The lower ends (in the drawing) of both these windings are grounded. When a series of unidirectional pulses, such as the positive pulses having a peak amplitude of E which are indicated by the reference character 68, are applied to the primary winding 64, the voltage induced across the secondary winding 66 will also have a peak amplitude of E (assuming a 1:1 transformer ratio). This will charge capacitors 40 and 44 to this peak potential E as fully described in connection with Fig. 6. If now a third rectifying unit 70 which comprises the impedance 72, diode 74, and capacitor 76 is added to the system, the capacitor 76 of this additional unit 70 will also be charged to the voltage E, as indicated. Consequently, the output voltage developed across the three series capacitors 40, 44 and 76 with respect to ground will be the sum of the individual voltages, or 3E, and this voltage 3E will appear on output capacitor 28'. The voltage on the coupling condensers 80 and/or 81, incidentally, is also equal to E.

While a maximum of three rectifying units has been illustrated and described, it will be obvious that any desired number of rectifying units may be connected in cascade in the manner taught by the present invention, and that the output voltage will be approximately the sum of the rectified voltages developed by the individual units.

Since the voltage developed by each rectifying unit, such as the voltage E appearing on the capacitors 40, 44 and 76 in Fig. 8 for example, is approximately equal to the peak input voltage to the system, it will be apparent that, irrespective of the number of units which are connected in cascade, the voltage rectified by the last stage will not exceed to any appreciable extent the voltage rectified by any preceding stage. Consequently, the peak voltage load on each circuit component of a multi-unit rectifier system constructed in accordance with the present invention is not appreciably greater than the load on the components of a system incorporating but a single stage.

While I have illustrated and described, and have pointed out in the annexed claims, certain novel features of my invention, it will be obvious that certain omissions, substitutions and changes in the form and details of the system illustrated may be made by those skilled in the art without departing from the spirit of the invention.

I claim:

1. In a system for obtaining a substantially smooth D.-C. voltage output from a series of unidirectional input voltage pulses, a transformer having a primary winding across which said unidirectional input pulses are applied and a pair of grounded secondary windings, said secondary windings being so related to said primary winding that positive and negative surge voltages are respectively developed across said secondary windings when said unidirectional input pulses are applied across said primary winding, a circuit for rectifying the said positive and negative surge voltages, said circuit including an electron discharge tube and an energy-storage device connected in series across both said secondary windings, whereby the peak potential developed on said energy-storage device as a result of the rectifying action of said circuit is substantially the sum of the positive and negative surge voltages respectively developed across the secondary windings of said transformer, an output load circuit, and means for connecting said energy-storage device to said output circuit so that there is developed in said output circuit a smooth D.-C. potential having a value with respect to ground approximately equal to the sum of the positive and negative surge voltages respectively developed across the secondary windings of said transformer.

2. In a system for obtaining a substantially smooth D.-C. voltage output from a series of unidirectional input voltage pulses, a transformer having a primary winding across which said unidirectional input pulses are applied and a pair of grounded secondary windings, said secondary windings being so related to said primary winding that positive and negative surge voltages are respectively developed across said secondary windings when said unidirectional input pulses are applied across said primary winding, a circuit for rectifying the said positive and negative surge voltages, said circuit including an electron discharge tube and an energy-storage device connected in series across both said secondary windings, whereby the peak potential developed on said energy-storage device as a result of the rectifying action of said circuit is substantially the sum of the positive and negative surge voltages respectively developed across the secondary windings of said transformer, a resistor having one end connected to said circuit between said electron discharge tube and said energy-storage device, a capacitor connected between the other end of said resistor and ground, and means for deriving an output voltage across said capacitor.

3. In a system for obtaining a substantially smooth D.-C. voltage output from a series of unidirectional input voltage pulses, a transformer, means for applying said unidirectional pulses to said transformer, the windings of said transformer being so arranged that the application of said unidirectional pulses to said transformer will cause both positive and negative surge voltages to be produced simultaneously on said windings, means for rectifying both said positive and negative surge voltages so as to obtain a rectified voltage having a peak amplitude approximately equal to the sum of the peak amplitudes of said positive and negative surge voltages, an output load circuit, and means for applying said rectified voltage to said output circuit so as to obtain in said output circuit a substantially smooth D.-C. voltage having a value approximately equal to the peak amplitude of said rectified voltage.

4. A system according to claim 3, in which said means for rectifying both said positive and negative surge voltages so as to obtain a rectified voltage having a peak amplitude approximately equal to the sum of the peak amplitudes of said positive and negative surge voltages includes an electron discharge device having at least an anode and a cathode, the anode of said electron discharge device being connected to receive the positive surge voltage produced by said transformer, an energy-storage device, means for connecting one terminal of said energy-storage device to the cathode of said electron discharge device, and means for applying the negative surge voltage produced by said transformer to the other terminal of said energy-storage device.

5. A system according to claim 3, in which said means for rectifying both said positive and negative surge voltages so as to obtain a rectified voltage having a peak amplitude approximately equal to the sum of the peak amplitudes of said positive and negative surge voltages includes an electron discharge device having at least an anode and a cathode, the anode of said electron discharge device being connected to receive the positive surge voltage produced by said transformer, an energy-storage device, means for connecting one terminal of said energy-storage device to the cathode of said electron discharge device, and means for applying the negative surge voltage produced by said transformer to the other terminal of said energy-storage device, and in which said means for filtering said rectified voltage includes a resistor one end of which is connected to the cathode of said electron discharge device, and a capacitor connected between the other end of said resistor and ground.

6. In a power supply system wherein the input voltages comprise a series of unidirectional voltage pulses of substantially equal peak amplitude and the output voltages are substantially smooth D.-C. potentials of a value equal to approximately twice the peak amplitude of said input pulses, the combination of a pair of rectifier units, each of said units including a rectifier element and an energy-storage device, means for applying said input pulses to one of said units so that said input pulses are rectified thereby to produce on the energy-storage device included in said one unit a potential having a value substantially equal to the peak amplitude of said input pulses, means for coupling said one rectifier unit to the other unit of said pair, said coupling means including an impedance conductive to direct current across which there is developed a voltage having a peak amplitude substantially equal to the peak amplitude of said input pulses, whereby the voltage appearing across said coupling impedance is rectified by said last-mentioned rectifier unit to produce on the energy-storage device of that unit a potential also having a value substantially equal to the peak amplitude of said input pulses, and means for connecting the energy-storage devices of each of said rectifier units in series to produce an output voltage across said energy-storage devices which is approximately equal to the sum of the voltages developed on each individual energy-storage device, such sum being approximately equal to twice the peak amplitude of the said input pulses.

7. In a power supply system wherein the input voltages comprise a series of unidirectional voltage pulses of substantially equal peak amplitude and the output voltages are substantially smooth D.-C. potentials having a value which is approximately equal to a multiple of the peak amplitude of said input pulses, the combination of a plurality of rectifier units, each of said units including a rectifier element in series with an energy-storage device, means for applying said input pulses to one of said units so that the said input pulses are rectified thereby to produce on the energy-storage device included in said one unit a potential having a value substantially equal to the peak amplitude of the said input pulses, means for coupling the remainder of said rectifier units in cascade to said one unit, said coupling means including means for applying across each of the said series-connected rectifier elements and energy-storage devices included in the remainder of said rectifying units a voltage having a peak amplitude approximately equal to the peak amplitude of said input pulses, whereby the voltage applied by said coupling means is rectified by the respective rectifier elements of said remaining units to produce on the respective energy-storage devices of such units a voltage approximately equal to the peak amplitude of said input pulses, and means for connecting the energy-storage devices of all said rectifier units in series so as to produce an output voltage across all of said energy-storage devices approximately equal to the sum of the voltages appearing on each individual energy-storage device.

8. In a voltage step-up arrangement, the combination of an impedance element conductive to direct current, means for developing a varying potential across said impedance element, a rectifier, a capacitor, means connecting said rectifier and said capacitor in series across said impedance element to charge said capacitor upon operation of said rectifier, a second impedance element conductive to direct current, means for developing said varying potential across said second impedance element, a second rectifier, a second capacitor, means connecting said second rectifier and said second capacitor in series across said second impedance element to charge said second capacitor upon operation of said second rectifier, and means connecting said first and second capacitors in series so that the potential appearing across the series capacitors is approximately equal to the sum of the potentials appearing on the individual capacitors.

9. An arrangement in accordance with claim 8, in which said first and second rectifiers comprise electron discharge tubes the cathodes of which are respectively connected to said first and second capacitors, and in which said means connecting said first and second capacitors in series comprises a connection between one plate of said first capacitor and the plate of said second capacitor having a charge which is of opposite polarity to that appearing on said one plate of said first capacitor.

10. In a system for obtaining a substantially smooth D.-C. voltage output from a series of unidirectional input voltage pulses, an impedance unit, means for applying said unidirectional pulses to said impedance unit and for deriving therefrom both positive and negative surge voltages, means for rectifying both said positive and negative surge voltages so as to obtain a rectified voltage having a peak amplitude approximately equal to the sum of the peak amplitudes of said positive and negative surge voltages, an output load circuit, and means for applying said rectified voltage to said output circuit so as to obtain in said output circuit a substantially smooth D.-C. voltage having a value approximately equal to the peak amplitude of said rectified voltage.

11. In a voltage step-up arrangement; a first rectifying unit including an impedance member conductive to direct current, a rectifier element, and a capacitor, said rectifier element and said capacitor being connected in series across said impedance; means for developing a varying potential across said impedance member so as to render said rectifier element conductive to charge said capacitor; a second rectifying unit including a further impedance member also conductive to direct current, a further rectifier element, and a further capacitor, said further rectifier element and said further capacitor being connected in series across said further impedance member; and means for coupling said further impedance member to said first rectifying unit so as to develop a varying voltage across said impedance member and thereby charge said further capacitor upon operation of said further rectifier element; and means for connecting said two capacitors in series so that the potential appearing across the series capacitors is approximately equal to the sum of the potentials appearing on the individual capacitors.

12. In a voltage step-up arrangement, a first rectifying unit including an energy-storage device, means for applying a varying potential to said rectifier unit so as to develop a substantially constant D.-C. voltage on said energy-storage device, a second rectifier unit including a further energy-storage device, means for coupling together said rectifier units so as to develop on said further energy-storage device a substantially constant D.-C. voltage approximately equal to the D.-C. voltage developed on the energy-storage device of said first rectifier unit, and means for effectively connecting said two energy-storage devices in series electrically.

13. In a system for obtaining, from an input consisting of a series of unidirectional voltage pulses, a substantially smooth D.-C. output voltage having an amplitude approximately equal to twice the amplitude of the input pulses, the combination of a first rectifier element and a first energy-storage device serially connected, means for applying said input pulses across the said series combination to charge the said first energy-storage device, a second series circuit including a second energy-storage device, a second rectifier element and a third energy-storage device, means for applying the charge on said first energy-storage device to charge said second energy-storage device, and means for applying said input pulses across the second series circuit so as to develop on said third energy-storage device a substantially smooth D.-C. voltage having an amplitude approximately equal to twice the amplitude of the input pulses.

14. A system according to claim 13, in which said rectifier elements are diodes.

15. A system according to claim 13, in which said energy-storage devices are condensers.

16. A rectifier system adapted to receive a series of voltage pulses across the input terminals thereof, said system including the first combination of a diode and a condenser in series across the said input terminals, the second combination of a further diode and two further condensers also in series across the said input terminals, said first and second combinations effectively being in parallel relation, an impedance element, and means for connecting the cathode of the diode of said first combination through said impedance element to the anode of the diode of said second combination.

17. A rectifier system in accordance with claim 16, further including the third series combination of a diode and two condensers also in series across the said input terminals, said first, second and third series combinations effectively being in parallel relation, a second impedance element, and means for connecting the cathode of the diode of said second series combination through said second impedance element to the anode of the diode of said third series combination.

18. A rectifier system adapted to receive a series of voltage pulses across the input terminals thereof, said system including the first series combination of an electron discharge tube and an energy-storage device connected across the said input terminals, one terminal of said energy-storage device being connected to the cathode of said electron discharge tube, a second series combination of an electron discharge tube and two energy-storage devices also in series across the said input terminals with the said electron discharge tube thereof being intermediate the said two energy-storage devices of the said combination, said first and second series combinations effectively being in parallel relation, an impedance element, and means for connecting the cathode of the electron discharge tube of said first combination through said impedance element to the anode of the electron discharge tube of said second combination.

19. In a system for obtaining, from an input consisting of a series of unidirectional voltage pulses, a substantially smooth D.-C. output voltage having an amplitude approximately equal to twice the amplitude of the input pulses, the combination of a first rectifier element and a first energy-storage device serially connected, means for applying said input pulses across the said series combination to charge the said first energy-storage device, a second series circuit including a second energy-storage device, a second rectifier element and a third energy-storage device, means, including an impedance element, for applying the charge on said first energy-storage device to charge said second energy-storage device, and means for applying said input pulses across the second series circuit so as to develop on said third energy-storage device a substantially smooth D.-C. voltage having an amplitude approximately equal to twice the amplitude of the input pulses.

OTTO H. SCHADE.